(12) United States Patent
Wang et al.

(10) Patent No.: US 11,314,784 B2
(45) Date of Patent: Apr. 26, 2022

(54) DATA MODEL PROPOSALS

(71) Applicant: International Business Machines Corporation, Armonk, NY (US)

(72) Inventors: Shaobo Wang, Ottawa (CA); Rebekah Lien, Ottawa (CA); Ilse M Breedvelt-Schouten, Manotick (CA)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 16/696,916

(22) Filed: Nov. 26, 2019

(65) Prior Publication Data

US 2021/0157826 A1 May 27, 2021

(51) Int. Cl.
*G06F 16/242* (2019.01)
*G06F 16/2457* (2019.01)
*G06F 16/248* (2019.01)
*G06F 16/28* (2019.01)
*G06F 16/34* (2019.01)

(52) U.S. Cl.
CPC .......... *G06F 16/287* (2019.01); *G06F 16/243* (2019.01); *G06F 16/248* (2019.01); *G06F 16/2423* (2019.01); *G06F 16/2457* (2019.01)

(58) Field of Classification Search
CPC .... G06F 16/287; G06F 16/243; G06F 16/248; G06F 16/2423; G06F 16/2457
See application file for complete search history.

(56) References Cited

U.S. PATENT DOCUMENTS

| | | | |
|---|---|---|---|
| 8,892,554 B2 | 11/2014 | Carmel et al. | |
| 2009/0182727 A1* | 7/2009 | Majko | G06F 16/9535 |
| 2010/0131899 A1* | 5/2010 | Hubert | G06F 16/986 |
| | | | 715/823 |
| 2010/0229082 A1* | 9/2010 | Karmarkar | H04W 4/029 |
| | | | 715/205 |
| 2011/0029567 A1* | 2/2011 | Banda | G06F 16/907 |
| | | | 707/784 |

(Continued)

OTHER PUBLICATIONS

Beck et al., RadCloud: Visualizing Multiple Texts with Merged Word Clouds, 2014, 18th International Conference on Information Visualisation, pp. 108-113 (Year: 2014).*

(Continued)

*Primary Examiner* — Jorge A Casanova
(74) *Attorney, Agent, or Firm* — Patterson + Sheridan, LLP (57) ABSTRACT

Relating data in various distributed data sources for use in data analysis is described. The data sources are generally related by first generating a keyword model for a plurality of data sources, which includes a plurality of weighted keywords, and providing a visual representation of the keyword model, such as a word cloud, to a user. The user interacts with the visual representation to modify, update, and select various aspects of the visual representation. The user also identifies keywords and data sources of interest such that a plurality of relational models are generated based on the user interest. Relating the data sources also includes providing the plurality of relational models to the user, receiving a user selection of the plurality of relational models, and generating a combined dataset model which relates one or more of the data sources according to the selected relational models.

20 Claims, 10 Drawing Sheets

(56) References Cited

U.S. PATENT DOCUMENTS

| | | | | |
|---|---|---|---|---|
| 2011/0282919 A1* | 11/2011 | Sweeney | ............... | G06F 16/252 |
| | | | | 707/805 |
| 2014/0195950 A1* | 7/2014 | Diament | ................ | G06F 16/34 |
| | | | | 715/771 |
| 2014/0215299 A1* | 7/2014 | Bellamy | ................ | G06F 40/10 |
| | | | | 715/211 |
| 2014/0282244 A1* | 9/2014 | Speer | .................... | G06F 16/444 |
| | | | | 715/811 |
| 2015/0205830 A1* | 7/2015 | Bastide | ................ | G06F 16/951 |
| | | | | 707/758 |
| 2016/0171090 A1* | 6/2016 | Schwartz | ............. | G06Q 10/101 |
| | | | | 707/730 |
| 2017/0270192 A1* | 9/2017 | Breedvelt-Schouten | .................... | |
| | | | | G06F 16/313 |
| 2018/0075104 A1 | 3/2018 | Oberbreckling et al. | | |
| 2018/0239741 A1* | 8/2018 | Agarwal | ............... | G06F 16/334 |

OTHER PUBLICATIONS

Nikhil Bodapati, "Visualizing Text Analysis Results with Word Clouds," dunbas.com [Accessed Online Aug. 19, 2019] https://www.dundas.com/resources/dundas-data-visualization-blog/.

Microsoft Docs, "Create and Manage relationships in Power Bi Desktop," Apr. 18, 2019 [Accessed Online Nov. 25, 2019] https://docs.microsoft.com/en-us/power-bi/desktop-create-and-manage-relationships.

IBM Cognos Analytics, "Smart Engine" [Accessed Online Nov. 25, 2109] https://www.ibm.com/products/cognosanalytics.

\* cited by examiner

FIG. 1A

PRODUCT 105a

| PRODUCT NAME 161 | PRICE 162 | INVENTORY 163 | SALES 164 |
|---|---|---|---|
| | | METADATA 152 | |
| 1 | | | |
| 2 | | | |
| 3 | | | |
| 4 | | | |

Q Type keywords, phrases, or questions

| | | |
|---|---|---|
| Sales reps 461 | Revenue | Product — Date |
| Analytics | Street | Vacations — Salary |
| Products | Status | Weeks — Cities |
| Position | People | Product lines — Brand |
| Amount | Education | Descriptions — Content |
| Period | Locations | Phone number — Code |
| Sales | House | Quantity 462 |
| Fixed | Years | Brand |
| | | Title |
| | | Unit |
| | | Week |
| | | Costs |
| | | Rate |

DATA MODEL PROPOSALS

BACKGROUND

Large data handling and analysis, such as business analytics, includes accessing and utilizing large numbers of data structures containing vast and diverse quantities of data. These data structures may include related data that can be useful for providing various insights in the analysis of the data. Associating and joining this related data across the large number of data structures presents a challenge that cannot be efficiently handled by a user reviewing the data manually. Current methods for analyzing this data involve a user manual searching to identify and relate the various data structures. Some existing automated or assistive methods to relate the data structures can identify relationships between data structures, but often fail to provide relevant information for the related data structures.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes generating a keyword model for a plurality of data sources which may include a plurality of weighted keywords sorted according to a weighted score of each of the plurality of weighted keywords and providing a visual representation of the keyword model to a user. The method also includes receiving a user query identifying keywords and data sources of interest to the user and generating a plurality of relational models for the plurality of data sources using the plurality of weighted keywords and the user query. The method also includes providing the plurality of relational models to the user, receiving a user selection input which may include a selection of at least one of the plurality of relational models and generating a combined dataset model from the plurality of data sources using the user selection input by associating the plurality of data sources according to the user selection input. Other embodiments of this aspect include corresponding computer systems, apparatus, and computer programs recorded on one or more computer storage devices, each configured to perform the actions of the methods.

One general aspect includes a system. The system also includes a processor; and a memory including instructions which, when executed on the processor, performs an operation, the operation may include: generating a keyword model for a plurality of data sources which may include a plurality of weighted keywords sorted according to a weighted score of each of the plurality of weighted keywords; providing a visual representation of the keyword model to a user; receiving a user query identifying keywords and data sources of interest to the user; generating a plurality of relational models for the plurality of data sources using the plurality of weighted keywords and the user query; providing the plurality of relational models to the user; receiving a user selection input which may include a selection of at least one of the plurality of relational models; and generating a combined dataset model from the plurality of data sources using the user selection input by associating the plurality of data sources according to the user selection input.

One general aspect includes a computer program product may include a non-transitory computer-readable medium program having program instructions embodied therewith to perform an operation. The operation may include: generating a keyword model for a plurality of data sources which may include a plurality of weighted keywords sorted according to a weighted score of each of the plurality of weighted keywords; providing a visual representation of the keyword model to a user; receiving a user query identifying keywords and data sources of interest to the user; generating a plurality of relational models for the plurality of data sources using the plurality of weighted keywords and the user query; providing the plurality of relational models to the user; receiving a user selection input which may include a selection of at least one of the plurality of relational models; and generating a combined dataset model from the plurality of data sources using the user selection input by associating the plurality of data sources according to the user selection input.

DETAILED DESCRIPTION

Data analysis and model building includes accessing and utilizing large numbers of data source and data structures. These data structures often include related data that can be useful for providing various insights in the analysis of the data. As discussed above, associating and joining this related data across the large number of data structures presents a challenge that cannot be efficiently handled by a user manually reviewing the data. Furthermore, current automated methods for relating data structures often fails to capture relevant relationships between data in various data structures. This leaves users and data modelers spending large amounts of time and resources trying to shift through and sort data in various data structures while attempting to identify the relevant data for their modeling purposes, instead of analyzing the data for a desired purpose.

The system and methods described herein provide an efficient method to quickly classify and relate various data sources in order to provide a user an interface to generate data models from various data sources. The data sources are initially scanned and used to generate a keyword model for the plurality of data sources, where the keyword model includes a plurality of weighted keywords. The keyword model is provided to a user in a visual representation such as a word cloud and keywords of interest received from the user are used to narrow down the data sources for use in generating a plurality of relational models. The word cloud provides the user an idea of what types of content are present in the data and which keywords are most likely to provide a good combination of data structures (relational models) for the final data analysis models. The relational models include suggested relationships or links between the data sources which are provided to the user. The user then selects which relational models are relevant and generates a combined dataset model. This dataset model links or combines the related datasets for use in data analysis.

Figure 1A:
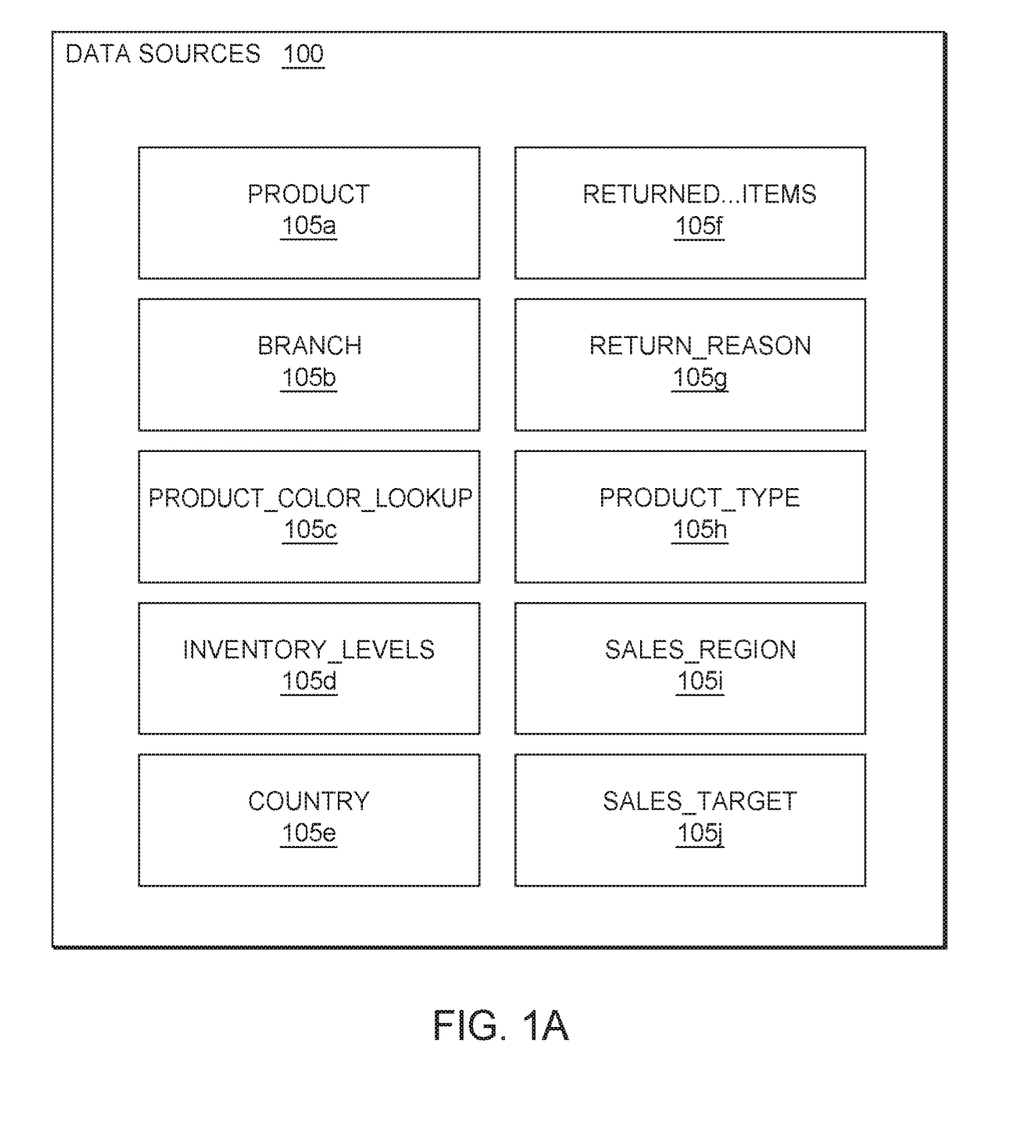
FIG. 1A illustrates example data sources, according to one embodiment.
Figure 1B:
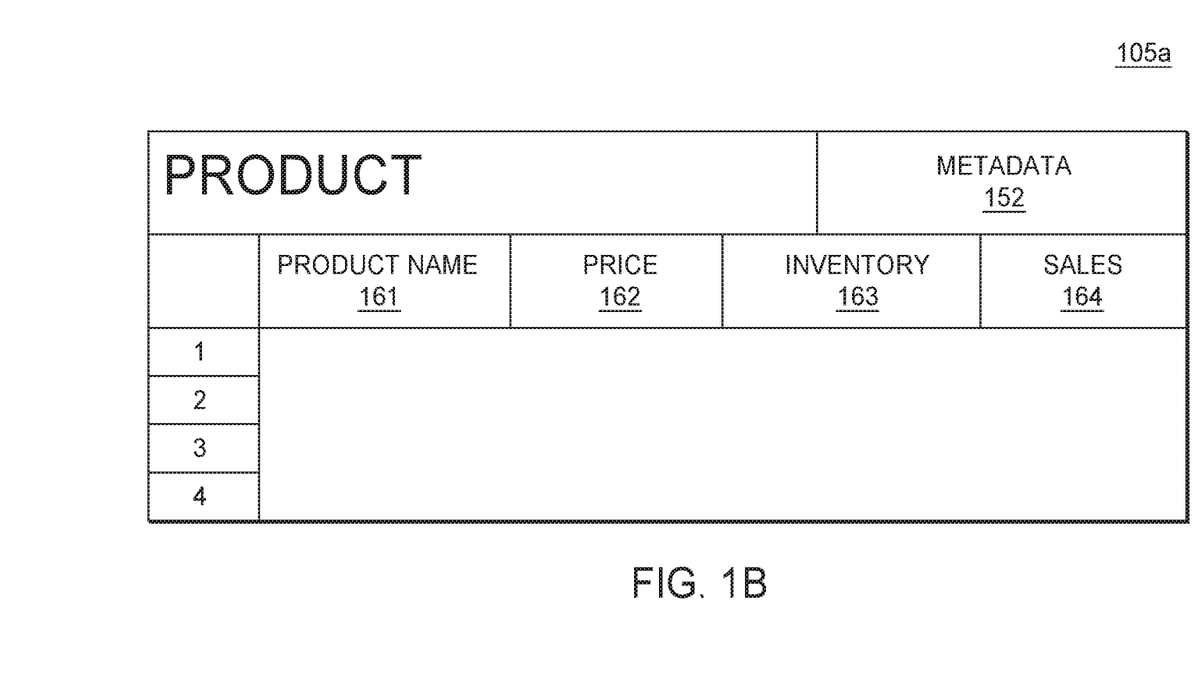
FIG. 1B illustrates an example data structure, according to one embodiment.

FIG. 1A illustrates example data sources, according to one embodiment. For example, data sources 100 include the data structures 105*a*-105*j*. The data structures 105*a*-105*j* each include a variety of data which may include data that is related to data stored in one or more of the other data structures. The data structures 105*a*-105*j* may include any type of organized and/or accessible data structure such as data tables or other accessible storage format. For example, as shown in FIG. 1B, the example data structure 105*a* is a data table which includes metadata 152. The metadata 152 includes a plurality of data representing the data structure 105*a* and may include data that is used to relate the data structure 105*a* to other data structures as described herein. The metadata 152 may include the title of the data structure 105*a* "Product") as well as various labels for columns of the data table. For example, the data structure 105*a* includes rows 1-4 and columns 161-164, where column 161 includes data related to a product names, column 162 includes data related to product prices, column 163 includes data related to inventory levels, and column 164 includes data related to a product sales. The data in the columns 161-164 may be present or related to data in other data tables, such as in the data structures 105*a*-*j*. The methods described herein provide an efficient way to identify these relationships and allow for a user to relate the data structures for data analysis models.

Returning back to FIG. 1A, in some examples the data structures 105*a*-*j* have data structures that may be related (e.g., the data structures are all tables with columns and relations/links may be determined between the data structures). The data structures illustrated in FIG. 1A are related to various metrics for a retail business. While some of the data structures can be related based on the various titles of the data sources, the type of data in the various data structures is not apparent based on the title and ad hoc modeling. Combining the tables based on the titles or other broad categories will likely not generate valuable data analysis models or information. For example, a data analysis model for evaluating a performance of the sales representatives (sales reps) for a business is not easily ascertainable based solely on the names of the data structures 105*a*-*j*. Determining relational models based on the data in the data structures themselves increases the value and information derivable from the data structures as described in relation to FIGS. 2-6B herein.

Figure 2:
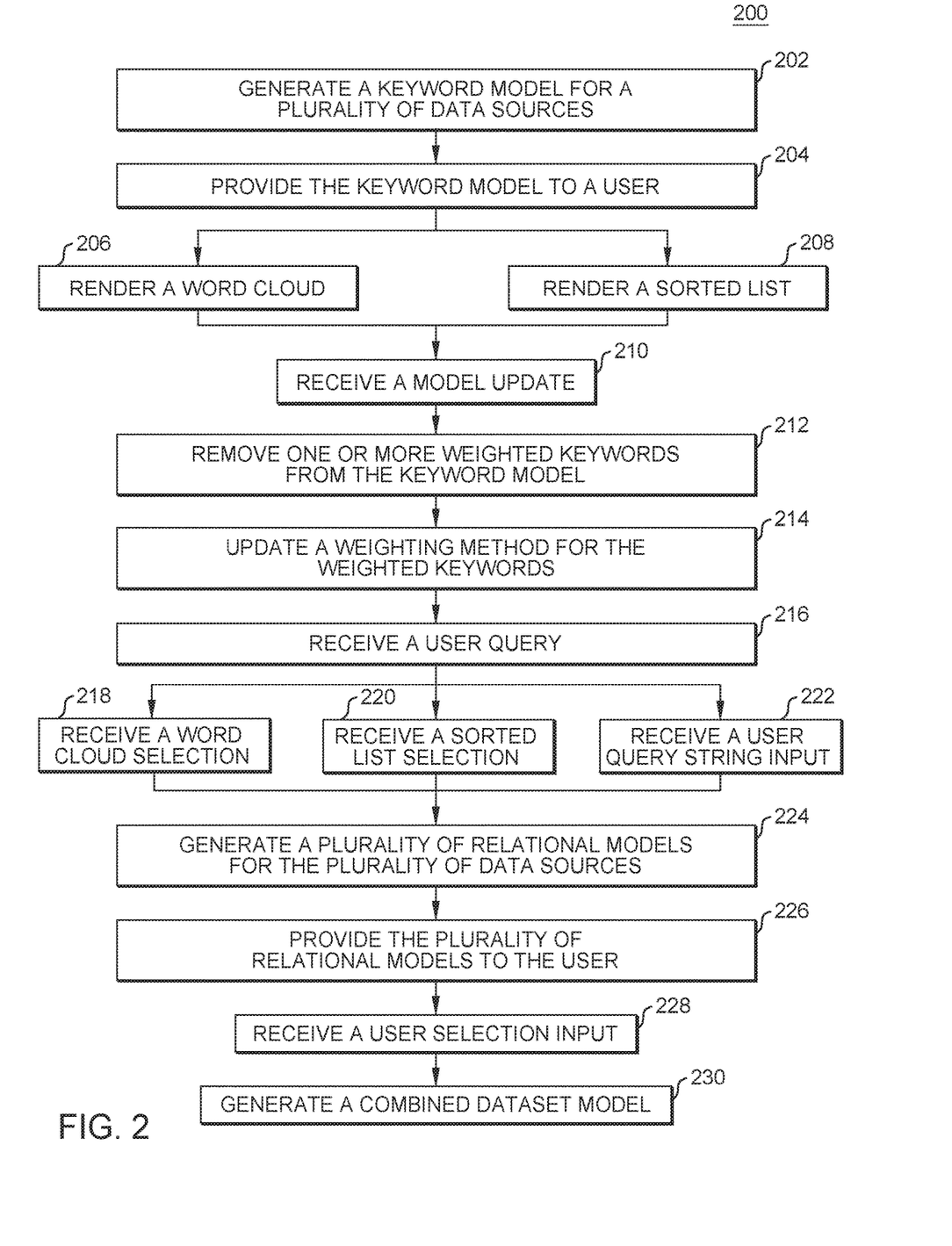
FIG. 2 is a method for relating data sources, according to one embodiment.

FIG. 2 is a method 200 for relating data sources, according to one embodiment. For ease of description, reference will be made to FIGS. 3-7 during the discussion of method 200. Method 200 begins at block 202, where a keyword module 711, as described in relation to FIG. 7, generates a keyword model for a plurality of data sources comprising a plurality of weighted keywords. In some examples, the keyword module 711 accesses a database server such as the data sources 100 and examines the data structures 105*a*-*j* for various keywords. The data sources (including the data structure 105*a*-*j*) may be specified by a user for a particular purpose. For example, a user seeking to generate a data analysis model for evaluating sales rep performance may select which data structures are relevant to their analysis. In another example, the user selects all data structures or sources available in order to avoid missing data that may be relevant.

In some examples, keywords for the data structures are included in the metadata for the data structures (e.g., metadata 152), where the keyword module 711 determines the keywords from the metadata. The keywords are also determined from the data in the data structures themselves, (e.g., from the columns 161-164 and the data within the columns). For example, the keyword module 711 examines the data structures for various keywords.

In some examples, the keyword module 711 also assigns a weight and/or weighted score to the determined keywords. For example, the keywords for the various data structures 105*a*-*j* are compiled together and assigned a weighted score based on criteria such as frequency of the keyword across the data structures. For example, a keyword "products" may appear frequently in more than one of the data structures 105*a*-*j* such that it is given a higher weighted score. For example, for a weighted scale from 1-100, the keyword "products" is given a weighted score of 85. In another example, a keyword "cities" appears less frequently and is given a lower weighted score such as 10. The keyword weighted scores may also be determined using a location of the keywords in the data structure (e.g. name of a data structure, name of column, within data field, etc.). For example, for the keyword "products" may be given a higher weighted score and/or the weighted score may be adjusted upwards when the keyword is present in the name or label of the data structure. In some examples, the keyword module 711 uses the weighted keywords to generate the keyword model where the model includes the keywords and the assigned weighted scores.

Figure 4A:
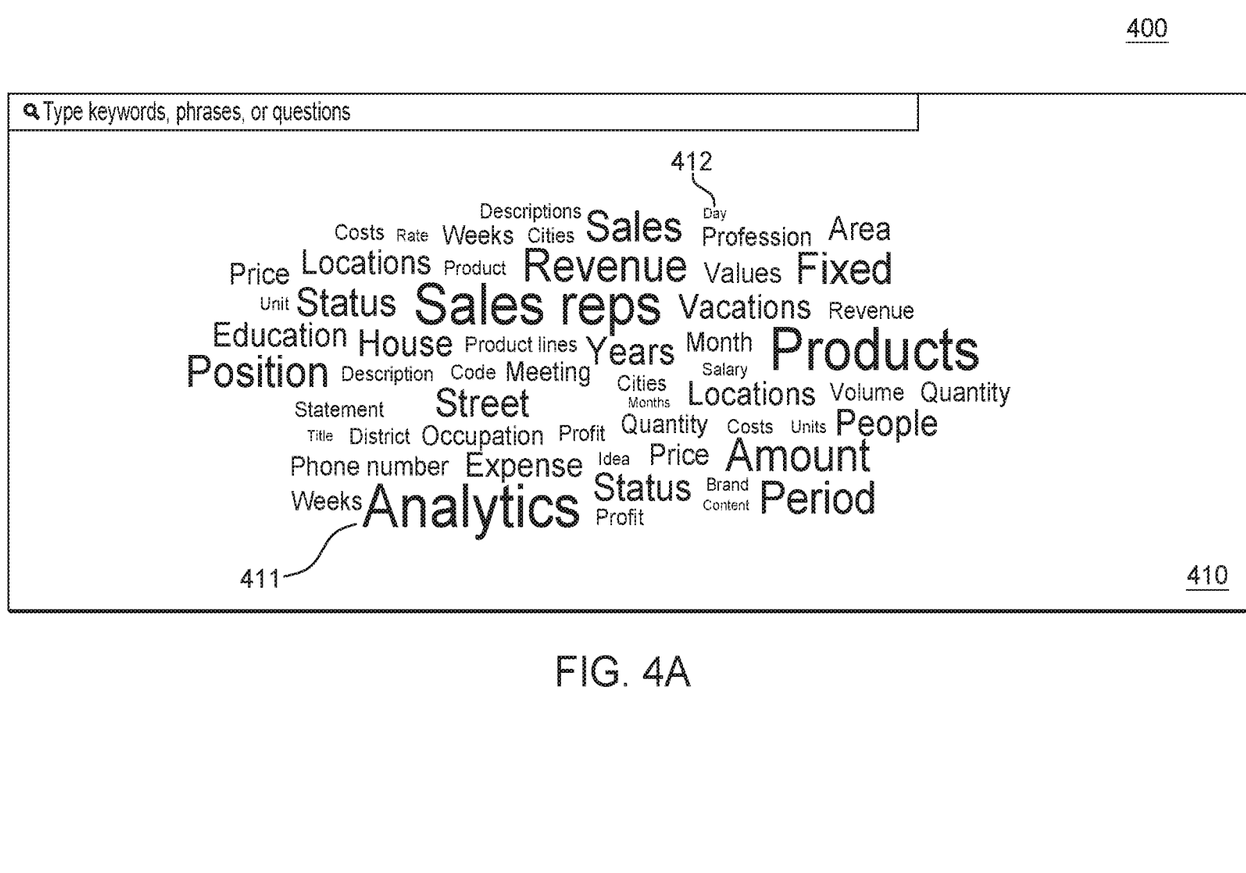
FIGS. 4A-4B illustrate example keyword model displays, according to various embodiments.
Figure 7:
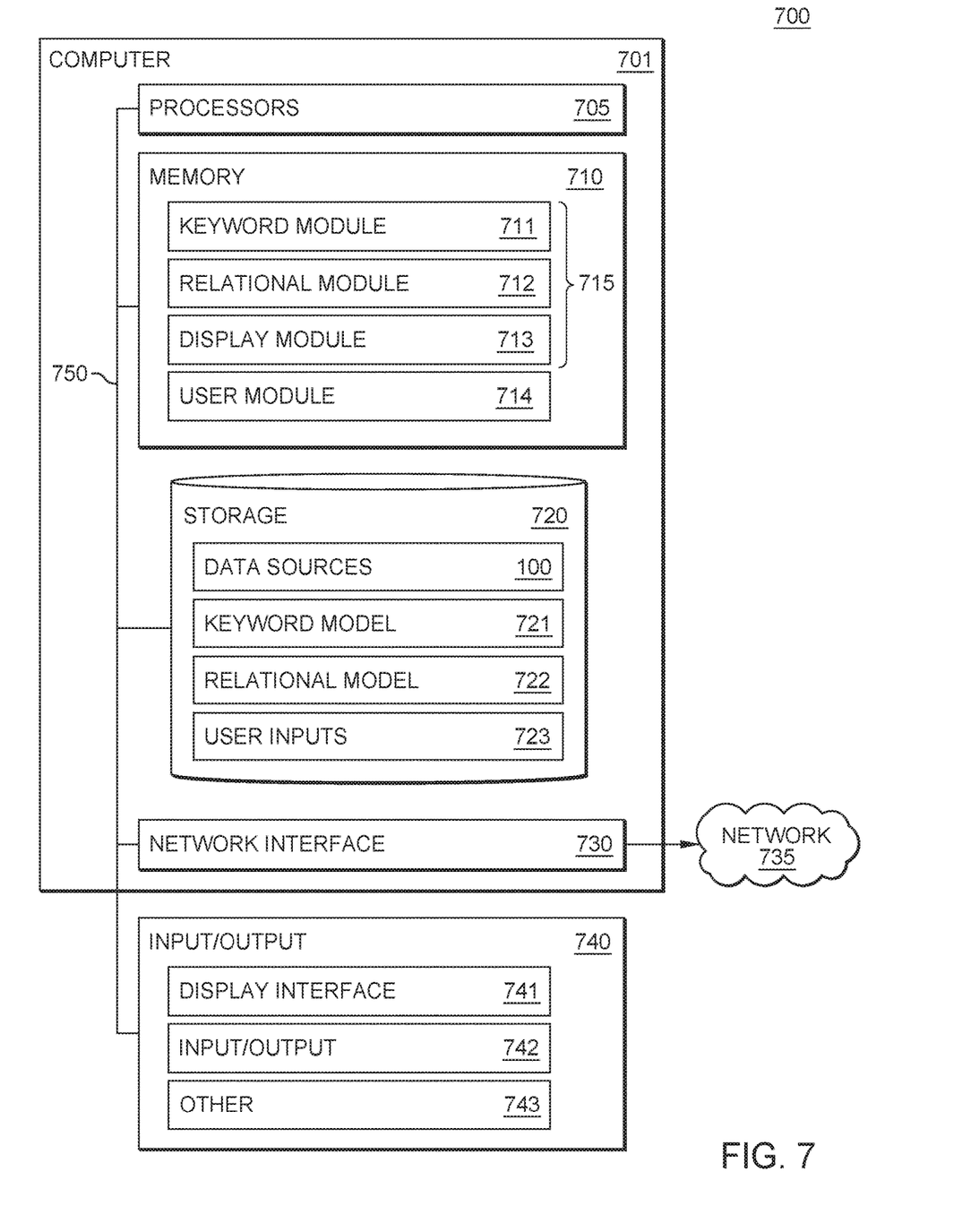
FIG. 7 is a block diagram of a computer to facilitate relating data sources, according to one embodiment.

At block 204, a display module 713, as described in relation to FIG. 7, provides the keyword model to a user. In some examples, the keyword model is provided to the user as data structure (e.g., a table of the keywords and the weighted scores). In other examples, in order to provide the user with a convenient and accessible display, the display module 713 provides the user with a visual representation of the keyword module. For example, at block 206 the display module 713 renders a word cloud representation of the keyword model. An example word cloud representation is shown in FIG. 4A where the display 400 includes the word cloud 410. The word cloud 410 includes the plurality of keywords from the keyword model generated at block 302, where the visual representation of the keywords includes a visual distinction between the keywords based on the weighted score of each of the keywords. For example, a keyword 411 "analytics" has a higher weighted score (e.g., 90) than a keyword 412 "day" with a lower weighted score (e.g., 7). In FIG. 410, the keyword 411 is shown with a large font and may also include a different color, different font, or other features to highlight the keyword 411 as having a higher weighted score relative to other keywords. In contrast, the keyword 412 is shown in a smaller font to indicate that keyword 412 has a lower weighted score relative to other keywords in the word cloud 410. These visual representations provide the user with a quick understanding of the data available in the data sources 100.

Figure 4B:
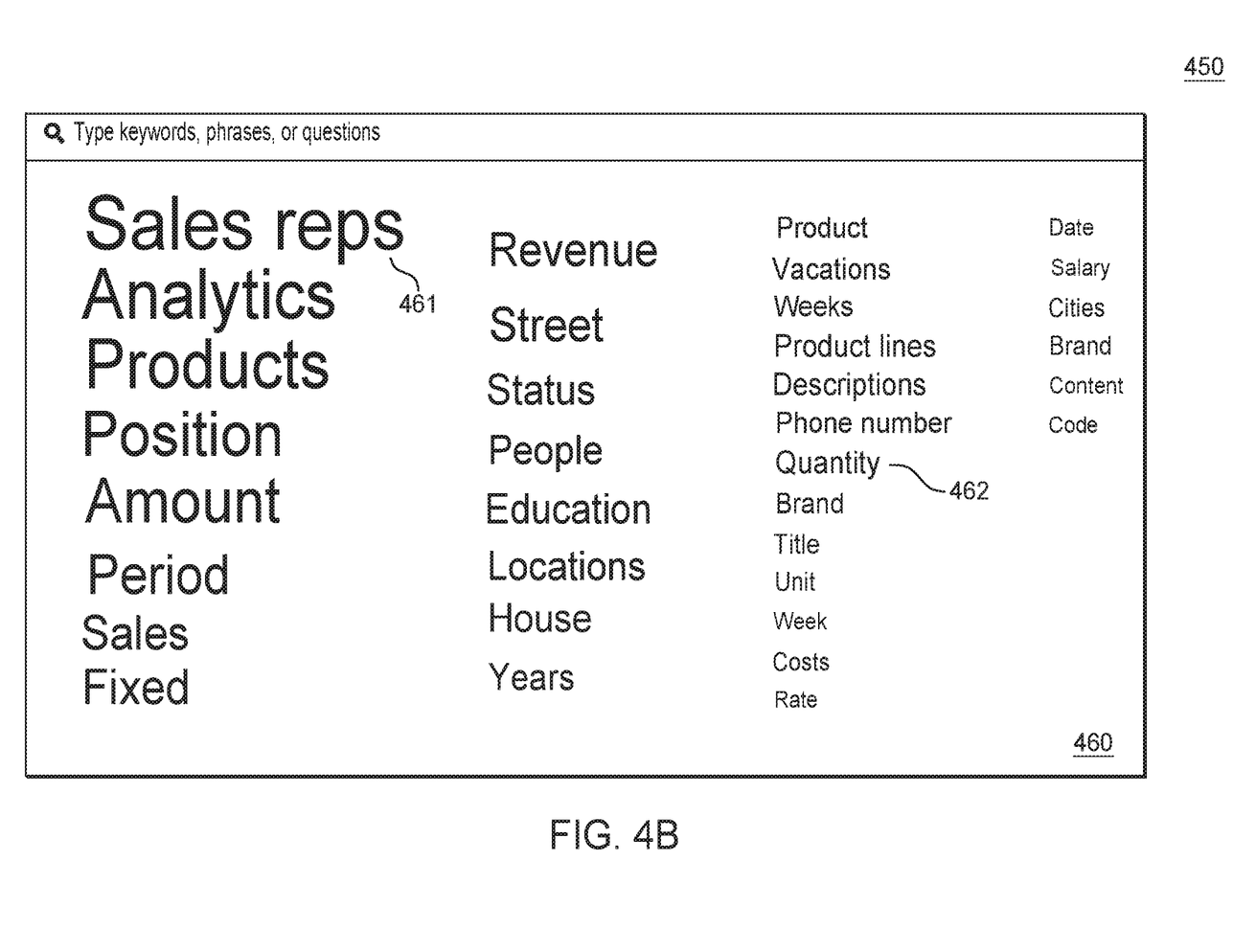

In another example, at block 208 the display module 713 renders the keyword model as a sorted list as shown in FIG.

4B, where the display 450 includes the sorted list 460. The sorted list includes a visual representation of the keyword model where the highest weighted keywords are shown first, and the lowest ranked keywords are sorted to the bottom or less prominent area. For example, the keyword 461 "sales reps" is shown at the beginning of the sorted list 460 and is also shown in a larger font to highlight its relative weighted score. In contrast, the keyword 462 "code" is shown at the end of the sorted list 460 and is shown in a smaller font.

While shown in two different displays in FIGS. 4A-B, the word cloud 410 and the sorted list 460 may both be rendered to the user simultaneously on a single display or as alternate displays that can be switched between by the user. For both the word cloud 410 and the sorted list 460, the number of the keywords displayed may be adjusted by the user. For example, a user adjusts the displays 400 or 450 to only display certain number (e.g., 50) of keywords, where only the (50) highest rated keywords are shown.

In some examples, the various data sources for the keyword model are also provided to the user and the user may add or remove data sources (e.g., add or remove data structures 105*a-j*) and/or keywords from the keyword model via using the display. For example, the user may select one or more keywords to be removed from the model. In one instance, the user may determine that a certain keyword is not relevant to a particular purpose and/or is not related to the other keywords. For example, "house" shown in FIGS. 4A-B is not related to sales rep performance and can be removed from the keyword model.

At block 210, the user module 714 shown in FIG. 7, receives a keyword model update from the user including the user selection. At block 212, the keyword module 711 removes one or more weighted keywords from the plurality of weighted keywords in the keywords model based on the keyword model update and updates a weighting method for the removed weighted keywords at block 214. For example, the keyword module 711 removes the keyword "house" from the keyword model for the data sources 100 and in some examples the keyword module updates settings for a future keyword model for the data sources 100 to not include the keyword "house." The keyword model update may also include removing a data structure from the data sources. For example, a user determines the data structure 105*g* "return reason" as not relevant to the sales rep evaluation and selects to have the data structure 105*g* removed from the keyword model. In this example, the keyword module 711 removes the data structure and the related effects on the weighted scores of the keywords from the keyword model.

Figure 5:
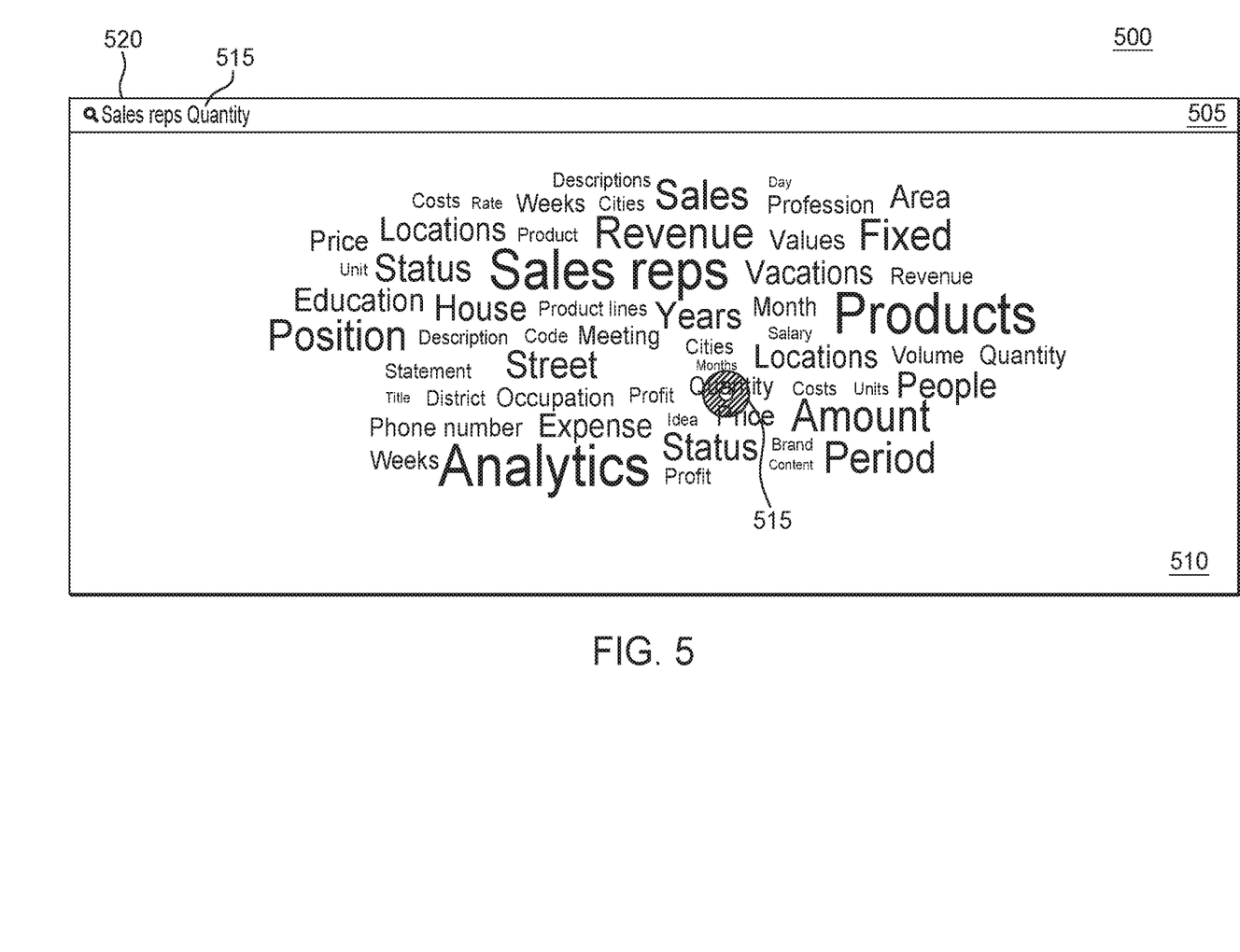
FIG. 5 illustrates an example user interaction with keyword model display, according to one embodiment.

At block 216, the user module 714 receives a user query. The user query includes a collection of keywords, words, and other string characters that indicates the types of links and/or relationships between the data sources desired by the user (e.g., keywords related to sales rep performance, etc.). The user may provide the query in a plurality of methods. For example, at block 218, the user module 714 receives a word cloud selection and adds the word cloud selection to the user query. FIG. 5 illustrates an example user interaction with keyword model display, display 500, according to one embodiment.

FIG. 5 includes a word cloud 510 and a user query window 505. The user query window includes user query keyword 520 and word cloud selection 515. As shown in FIG. 5, the user selects the keyword "quantity" as the word cloud selection 515 in the word cloud 510 and adds the keyword "quantity" the to the user query window 505. At block 220, the user module 714 receives a sorted list selection in a manner similar to the word cloud selection shown in FIG. 5. For example, the user may select a keyword in the sorted list (e.g., sorted list 460) and it is added to the user query window 505. At block 222, the user module 714 receives a user query string input. For example, the user inputs a string of words (e.g., a natural language query, keywords, etc.) using a keyword or other input device and the user query string input is added to the user query window 505. While shown as separate steps, the block 218-222 may be performed together and/or in any order such that the user query input is a combination of the various selection/input methods.

At block 224, a relational module 712, as described in relation to FIG. 7, generates a plurality of relational models for the plurality of data sources using the plurality of weighted keywords and the user query. At block 226, the display module 713 provides the plurality of relational models to the user. Blocks 224 and 226 are discussed in more detail in relation to method 300 of FIG. 3.

Figure 3:
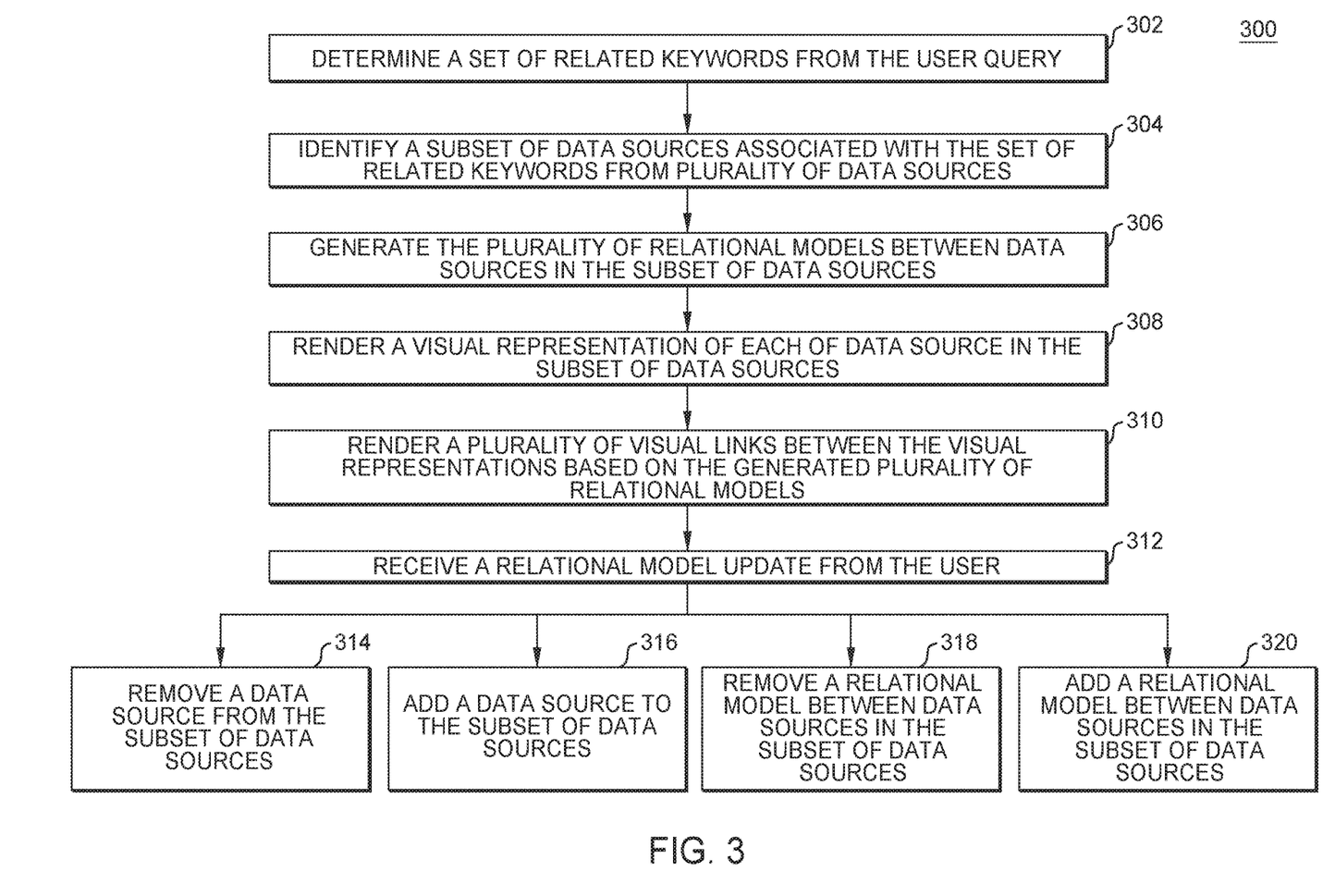
FIG. 3 is a method for generating relational models, according to one embodiment.

FIG. 3 is a method for generating relational models, according to one embodiment. Method 300 begins at block 302 where the relation module 712 begins generating a plurality of relational models for the plurality of data sources by determining a set of related keywords from the user query. For example, for the user query, received via the user query window 505 in FIG. 5, includes the keywords "sales rep" and "quantity." In some examples, the relational module 712 determines one or more additional keywords based on the received keywords or user query (e.g., "people") and adds the additional keywords to the determined related keywords.

At block 304, the relational module 712 identifies a subset of data sources associated with the set of related keywords from plurality of data sources. For example, the relational module 712 identifies the data structures in the data sources 100 that contain the related keywords. For example, the data structures 105*a*-105*j* that include the "quantity" and "sales rep" are included in the subset of data sources. The subset may also include other data structures related to the user query that include keywords related to the keywords in the user query (e.g., products may be included in the subset since the "products" keyword is closely related to the "quantity" and "sales rep" keywords).

At block 306, the relational module 712 generates the plurality of relational models between data sources in the subset of data sources based on the related keywords and the plurality of weighted keywords. For example, relational module 712 determines links and relationships between and across various columns in the data structures 105*a-j*. For example, the data structures that include "sales reps" in the data of the data structures are linked together to indicate a relationship between the data structures. In some examples, the links are assigned a confidence level based on the weighted score of the related keywords. For example, the links between the "sales rep" related columns and data structures are given a higher confidence level than links between the "quantity" related columns and data structures based on the relative weighted scores of the keywords.

In some examples, the relational module 712, generates a primary set of relational models based on the plurality of weighted keywords and the user query and one or more alternate relational models based on the plurality of weighted keywords and the user query. For example, a primary set of links and relationships is generated to maximize the confidence levels of each of the links/relationships and secondary or alternate set of links and relationships are generated to provide representation of lower confidence links and relationships.

Figure 6A:
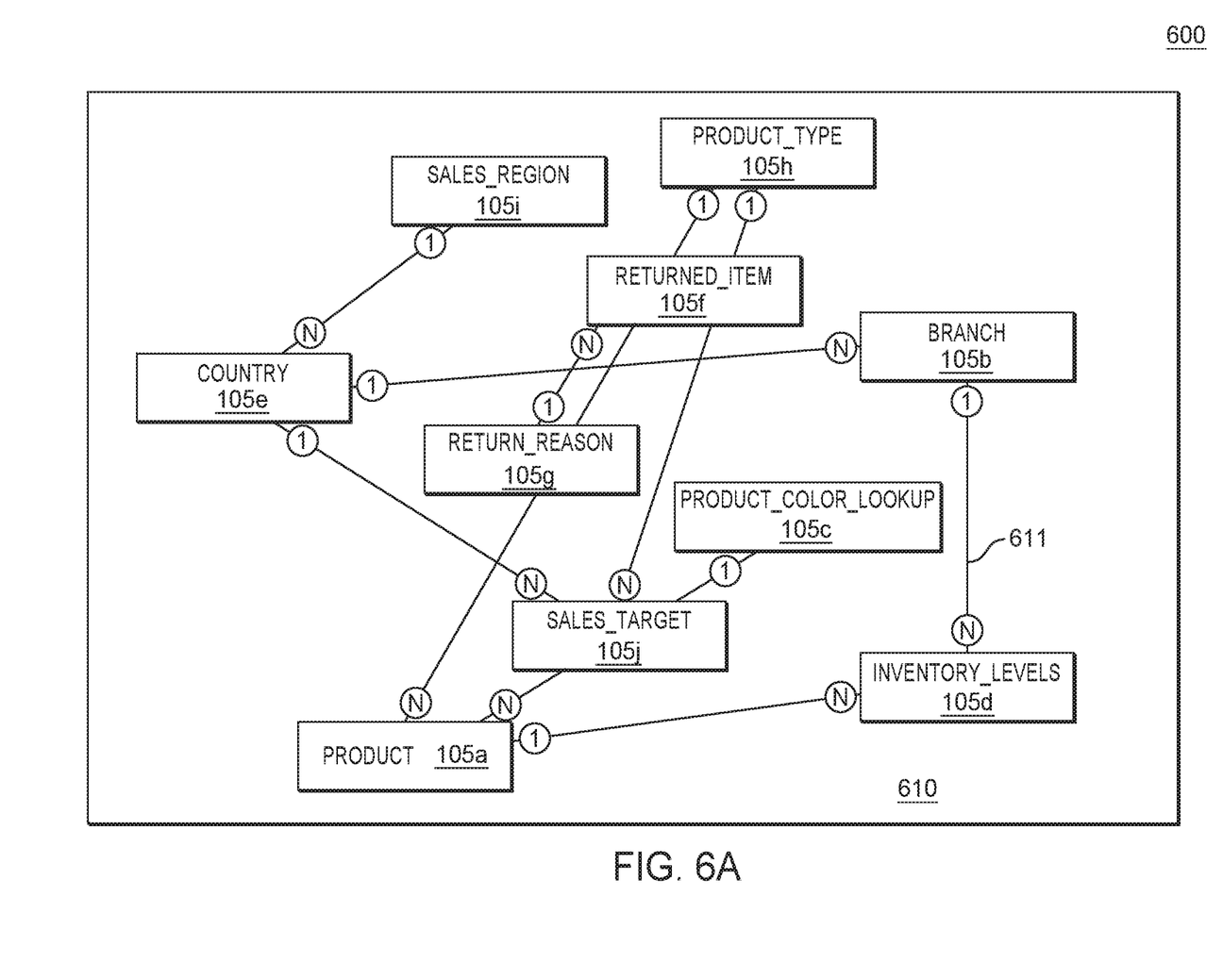
FIGS. 6A-6B illustrate example relational model displays, according to various embodiments.

At block 308, the display module 713 provides the plurality of relational models to the user by rendering a visual representation of each of data source in the subset of data sources. For example, as shown in FIG. 6 which illustrates an example relational model display, a display 600 includes the relational model 610. The relational model 610 includes a visual representation of the subset of data sources (e.g., the data structures 105a-j).

Figure 6B:
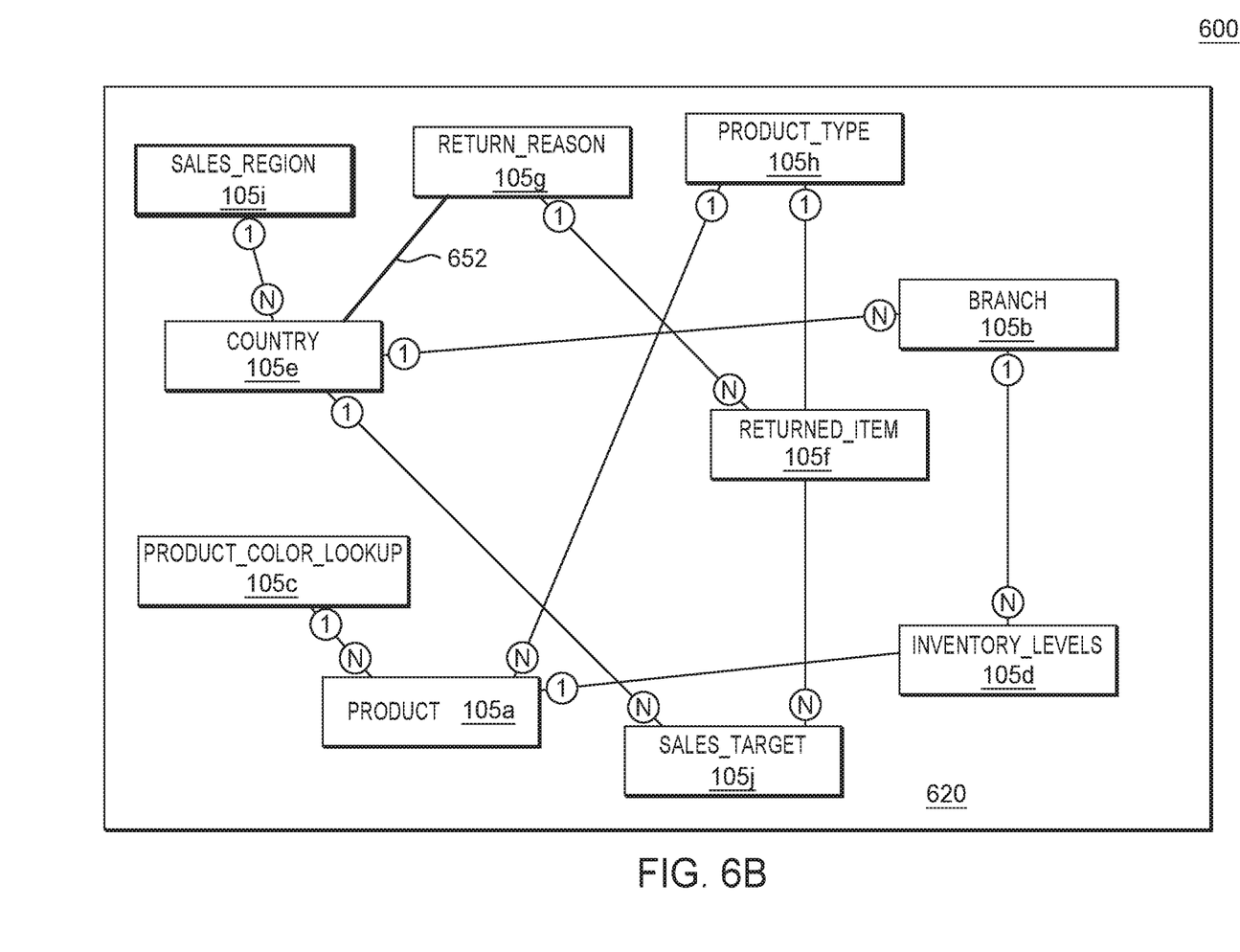

At block 310, the display module 713 renders a plurality of visual links between the visual representations based on the generated plurality of relational models. For example, a link 611 illustrates a relational model/link between the data structures 105b and 105d. This indicates that the data structures 105b and 105d both include data related to the keywords in the user query. In some examples, the confidence and/or strength of the link or relationship between the data structures in the relational model 610 is indicated by a color and/or a size of the visual representation of the link. For example, the link 611 may be a thick line or shown in a bold color to indicate a strong relationship between the data structures. The display module 713 may also render the one or more alternate relational models such that a user can view a variety of proposed relational models. For example, the relation model 620 shown in FIG. 6B depicts an alternate relational model as compared to the relational model 610.

At block 312, the user module 714 receives a relational model update from the user. For example, as shown in FIG. 6B, a user may select a data structure to include or exclude from the relational model (e.g., select the data structure 105i to be included or excluded from relational model 620). The user may also form a new link between data structure such as link 652 in order to provide a relationship between data sources that have not been linked/related by the relational module 712 for the relational model 620.

At block 312 updates the plurality of relational models based on the relational model update. The update may include one or more of removing a data source from the subset of data sources at block 314, adding a data source to the subset of data sources at block 316, removing a relational model between data sources in the subset of data sources at block 318, and adding a relational model between data sources in the subset of data sources at block 320. In each example from blocks 314-320 the weighted scores for the keywords in the keyword model and the confidence levels for the links in the relational model are updated according to the relational model update. In some examples, the relational model update is stored for future use such that as during a future process with the data sources 100 and a similar user query (e.g., sale rep evaluations, etc.) the keyword model and relational model can target specific data sources and keywords for the various relational model proposals.

Returning back to FIG. 2, at block 228 the user module 714 receives a user selection input, in some examples, the user selects one or more of the relational proposals shown in FIG. 6A for a data analysis model. For example, the user may select the proposes relation model 610 in its entirety or may select a subset of links/relations in the plurality of relation models. In another example, the user may select a combination of a plurality of relational models (e.g., a primary model such as 610 and one or more secondary models such as 620) for the data analysis model.

At block 230, the relational module 712 generates a combined dataset model from the plurality of data sources using the user selection input. The combined dataset model includes the data for use in the data analysis model. In some examples, the combined dataset model includes the various links between the data structures 105a-j such that a user can access the data across the data structures. In another example, the combined dataset model combines the data from the data structures themselves to produce a data analysis model for use in various data analytics. For example, as described herein, the selected relational model 610 is used to generate a data analysis model for evaluating sales rep performance as derived from the various data sources 100.

FIG. 7 is a block diagram of a computer 701, to facilitate relating data sources, according to one embodiment. The arrangement 700 includes the computer 701 which executes the functions and methods described herein, including the methods 200 and 300. The computer 701 is shown in the form of a general-purpose computing device. The components of computer 701 include, but are not limited to, one or more processors or processing units 705, a system memory 710, a storage system 720, network interface 730, and a bus 750 that couples various system components including the system memory 710 and storage system 720 to processors 705 along with various input/output (I/O) components 740. In other embodiments, arrangement 700 is distributed and includes a plurality of discrete computing devices that are connected through wired or wireless networking.

In some examples, I/O components 740 include a display interface 741, input/output device 742, and other input/output components 743. The display interface may include any display capable of displaying the visual representations described herein (e.g., a computer screen, a touch display, etc.) The input/output device 742 344 may include a keyboard, mouse, touch screen display, or other input/output components configured to allow a user (e.g., a data modeler) to input information to the computer 701. Computer 701 also communicates with one or more external devices that enable computer 701 to communicate with one or more other computing devices locally and/or remotely via network interface 730 and network 735. Such communication can also occur via I/O components 740. Additionally, computer 701 may communicate with one or more networks such as a local area network (LAN), a general wide area network (WAN), and/or a public network (e.g., the Internet) via network interface 730. As depicted, network interface 730 communicates with the other components of computer 701 via bus 750. It should be understood that although not shown, other hardware and/or software components could be used in conjunction with computer 701. Examples, include, but are not limited to: cloud computing systems, microcode, device drivers, redundant processing units, external disk drive arrays, RAID systems, tape drives, and data archival storage systems, etc.

Bus 750 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component interconnects (PCI) bus.

Computer 701 typically includes a variety of computer system readable media. Such media may be any available media that is accessible by computer 701, and it includes both volatile and non-volatile media, removable and non-removable media. System memory 710 can include computer system readable media in the form of volatile memory, such as random access memory (RAM) and/or cache memory. Computer 701 may further include other removable/non-removable, volatile/non-volatile computer system storage media. By way of example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 750 by one or more data media interfaces. As will be further depicted and described below, memory 710 may include at least one program product having a set (e.g., at least one) of program modules 715 that are configured to carry out the functions of embodiments of the disclosure described herein.

Storage 720 also includes media for storing data sources 100, keyword model(s) 721, relational model(s) 722 and user inputs 723. The various data is updated and accessed by the program modules 715 Storage system 720 also includes other information stored for access and use by the computer 701.

Memory 710 includes a plurality of program modules 715 for performing various functions described herein and in relation to FIGS. 2-6B. The modules 715 generally include program code that is executable by one or more of the processors 705.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the proceeding reference is made to embodiments presented in this disclosure. However, the scope of the present disclosure is not limited to specific described embodiments. Instead, any combination of the proceeding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the proceeding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to art external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the program module 715) or related data (e.g. the data sources 100) available in the cloud. For example, the keyword module 711 and the relational module 712 could execute on a computing system in the cloud and generate the keyword models and relational models via the cloud computing structure. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
generating a keyword model for a plurality of data sources comprising a plurality of weighted keywords sorted according to a weighted score of each of the plurality of weighted keywords;
providing a visual representation of the keyword model to a user;
receiving a user query identifying keywords and data sources of interest to the user;
generating a plurality of relational models for the plurality of data sources using the plurality of weighted keywords and the user query, wherein each relational model of the plurality of relational models comprises a relational link between at least two data sources of the plurality of data sources;
providing the plurality of relational models to the user;
receiving a relational model update from the user;
updating the plurality of relational models based on the relational model update;
receiving a user selection input comprising a selection of at least one of the plurality of relational models; and
generating a combined dataset model from the plurality of data sources using the user selection input by associating the plurality of data sources according to at least a relational link in the at least one of the plurality of relational models in the user selection input.

2. The method of claim 1, further comprising:
upon providing the keyword model to the user, receiving a keyword model update from the user;
removing one or more weighted keywords from the plurality of weighted keywords in the keywords model based on the keyword model update; and
updating a weighting method for the removed weighted keywords.

3. The method of claim 1, wherein providing the keyword model to the user comprises at least one of:

rendering the keyword model as a word cloud to the user, wherein the word cloud comprises the plurality of weighted keyword, wherein the word cloud comprises a visual distinction between the plurality of weighted keywords based on relative assigned scores of the plurality of weighted keywords; and rendering the keyword model as a sorted list to the user, wherein the sorted listed comprises the plurality of weighted keyword sorted according to the relative assigned scores; and wherein receiving the user query comprises at least one of:

receiving a word cloud selection from the user via the word cloud;

receiving a sorted list selection from the user via the sorted list; and receiving a user query string input.

4. The method of claim 1, wherein generating the plurality of relational models comprises:

determining a set of related keywords from the user query;

identifying a subset of data sources associated with the set of related keywords from the plurality of data sources; and generating the plurality of relational models between data sources in the subset of data sources based on the set of related keywords and the plurality of weighted keywords.

5. The method of claim 4, wherein providing the plurality of relational models to the user comprises:

rendering a visual representation of each of data source in the subset of data sources; and rendering a plurality of visual links between the visual representations based on the generated plurality of relational models.

6. The method of claim 5, wherein the relational model update comprises at least one of:

removing a data source from the subset of data sources;
adding a data source to the subset of data sources;
removing a relational model between data sources in the subset of data sources; and
adding a relational model between data sources in the subset of data sources.

7. The method of claim 1, wherein generating the plurality of relational models comprises:

generating a primary set of relational models based on the plurality of weighted keywords and the user query; and
generating one or more alternate relational models based on the plurality of weighted keywords and the user query.

8. A system, comprising:
a processor; and
a memory comprising instructions which, when executed on the processor, performs an operation, the operation comprising:

generating a keyword model for a plurality of data sources comprising a plurality of weighted keywords sorted according to a weighted score of each of the plurality of weighted keywords;

providing a visual representation of the keyword model to a user;

receiving a user query identifying keywords and data sources of interest to the user;

generating a plurality of relational models for the plurality of data sources using the plurality of weighted keywords and the user query, wherein each relational model of the plurality of relational models comprises a relational link between at least two data sources of the plurality of data sources;

providing the plurality of relational models to the user;
receiving a relational model update from the user;
updating the plurality of relational models based on the relational model update;

receiving a user selection input comprising a selection of at least one of the plurality of relational models; and generating a combined dataset model from the plurality of data sources using the user selection input by associating the plurality of data sources according to at least a relational link in the at least one of the plurality of relational models in the user selection input.

9. The system of claim 8, wherein the operation further comprises:

upon providing the keyword model to the user, receiving a keyword model update from the user;

removing one or more weighted keywords from the plurality of weighted keywords in the keywords model based on the keyword model update; and updating a weighting method for the removed weighted keywords.

10. The system of claim 8, wherein providing the keyword model to the user comprises at least one of:

rendering the keyword model as a word cloud to the user, wherein the word cloud comprises the plurality of weighted keyword, wherein the word cloud comprises a visual distinction between the plurality of weighted keywords based on relative assigned scores of the plurality of weighted keywords; and rendering the keyword model as a sorted list to the user, wherein the sorted listed comprises the plurality of weighted keyword sorted according to the relative assigned scores; and wherein receiving the user query comprises at least one of:

receiving a word cloud selection from the user via the word cloud;

receiving a sorted list selection from the user via the sorted list; and receiving a user query string input.

11. The system of claim 8, wherein generating the plurality of relational models comprises:

determining a set of related keywords from the user query;

identifying a subset of data sources associated with the set of related keywords from the plurality of data sources; and generating the plurality of relational models between data sources in the subset of data sources based on the set of related keywords and the plurality of weighted keywords.

12. The system of claim 11, wherein providing the plurality of relational models to the user comprises:

rendering a visual representation of each of data source in the subset of data sources; and rendering a plurality of visual links between the visual representations based on the generated plurality of relational models.

13. The system of claim 12, wherein the relational model update comprises at least one of:

removing a data source from the subset of data sources;
adding a data source to the subset of data sources;
removing a relational model between data sources in the subset of data sources; and adding a relational model between data sources in the subset of data sources.

14. The system of claim 8, wherein generating the plurality of relational models comprises:
generating a primary set of relational models based on the plurality of weighted keywords and the user query; and
generating one or more alternate relational models based on the plurality of weighted keywords and the user query.

15. A computer program product comprising a non-transitory computer-readable medium program having program instructions embodied therewith, the program instructions executable by a processor to perform an operation comprising:
generating a keyword model for a plurality of data sources comprising a plurality of weighted keywords sorted according to a weighted score of each of the plurality of weighted keywords;
providing a visual representation of the keyword model to a user;
receiving a user query identifying keywords and data sources of interest to the user;
generating a plurality of relational models for the plurality of data sources using the plurality of weighted keywords and the user query, wherein each relational model of the plurality of relational models comprises a relational link between at least two data sources of the plurality of data sources;
providing the plurality of relational models to the user;
receiving a relational model update from the user;
updating the plurality of relational models based on the relational model update;
receiving a user selection input comprising a selection of at least one of the plurality of relational models; and
generating a combined dataset model from the plurality of data sources using the user selection input by associating the plurality of data sources according to at least a relational link in the at least one of the plurality of relational models in the user selection input.

16. The computer program product of claim 15, wherein the operation further comprises:
upon providing the keyword model to the user, receiving a keyword model update from the user;
removing one or more weighted keywords from the plurality of weighted keywords in the keywords model based on the keyword model update; and
updating a weighting method for the removed weighted keywords.

17. The computer program product of claim 15, wherein providing the keyword model to the user comprises at least one of:
rendering the keyword model as a word cloud to the user, wherein the word cloud comprises the plurality of weighted keyword, wherein the word cloud comprises a visual distinction between the plurality of weighted keywords based on relative assigned scores of the plurality of weighted keywords; and
rendering the keyword model as a sorted list to the user, wherein the sorted listed comprises the plurality of weighted keyword sorted according to the relative assigned scores; and
wherein receiving the user query comprises at least one of:
receiving a word cloud selection from the user via the word cloud;
receiving a sorted list selection from the user via the sorted list; and
receiving a user query string input.

18. The computer program product of claim 15, wherein generating the plurality of relational models comprises:
determining a set of related keywords from the user query;
identifying a subset of data sources associated with the set of related keywords from the plurality of data sources; and
generating the plurality of relational models between data sources in the subset of data sources based on the set of related keywords and the plurality of weighted keywords.

19. The computer program product of claim 18, wherein providing the plurality of relational models to the user comprises:
rendering a visual representation of each of data source in the subset of data sources; and
rendering a plurality of visual links between the visual representations based on the generated plurality of relational models.

20. The computer program product of claim 19, wherein the relational model update comprises at least one of:
removing a data source from the subset of data sources;
adding a data source to the subset of data sources;
removing a relational model between data sources in the subset of data sources; and
adding a relational model between data sources in the subset of data sources.

* * * * *